(12) United States Patent
Hosaka et al.

(10) Patent No.: US 9,136,780 B2
(45) Date of Patent: Sep. 15, 2015

(54) CONTROLLER FOR DRIVING A MOTOR AND ELECTRIC POWER-ASSISTED VEHICLE

(71) Applicant: TAIYO YUDEN CO., LTD., Tokyo (JP)

(72) Inventors: Yasuo Hosaka, Tokyo (JP); Satoru Shimizu, Tokyo (JP); Kazuo Asanuma, Tokyo (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 280 days.

(21) Appl. No.: 13/972,644

(22) Filed: Aug. 21, 2013

(65) Prior Publication Data

US 2014/0084819 A1    Mar. 27, 2014

(30) Foreign Application Priority Data

Sep. 24, 2012  (JP) .................................. 2012-209128

(51) Int. Cl.
*H02P 1/00* (2006.01)
*H02P 3/18* (2006.01)
(Continued)

(52) U.S. Cl.
CPC ... *H02P 3/18* (2013.01); *B60L 7/08* (2013.01); *B60L 7/12* (2013.01); *B60L 7/26* (2013.01); *B60L 11/007* (2013.01); *B60L 11/1805* (2013.01); *B60L 11/1861* (2013.01); *B60L 15/2009* (2013.01); *B60L 2200/12* (2013.01);
(Continued)

(58) Field of Classification Search
CPC ..... Y02T 10/7005; Y02T 10/70; B60W 10/08
USPC .......................................... 318/139, 375, 376
See application file for complete search history.

(56) References Cited

U.S. PATENT DOCUMENTS

| 1,291,233 A | 1/1919 | Storer |
| 4,111,274 A | 9/1978 | King et al. |

(Continued)

FOREIGN PATENT DOCUMENTS

| EP | 0 976 649 A2 | 2/2000 |
| EP | 0 994 015 A2 | 4/2000 |

(Continued)

OTHER PUBLICATIONS

Japanese Office Action dated Jul. 29, 2014, in a counterpart Japanese patent application No. 2012-209128.

(Continued)

*Primary Examiner* — Rina Duda
(74) *Attorney, Agent, or Firm* — Chen Yoshimura LLP

(57) ABSTRACT

A controller for driving a motor has: an input part that receives, from each of two brake sensors, a signal indicating a corresponding brake is in an ON state or a signal indicating that the brake is in an OFF state; a control coefficient computing part that increases a control coefficient relative to a regeneration target value along a first slope when a first signal indicating only one of the brakes is in an ON state is received from the input part, the control coefficient computing part increasing the control coefficient along a second slope when a second signal indicating both brakes are in an ON state is received from the input part, the second slope rising faster than the first slope; and a control part controlling driving of the motor in accordance with the regeneration target value and the control coefficient computed by the control coefficient computing part.

6 Claims, 18 Drawing Sheets

(51) Int. Cl.
  *B60L 7/26* (2006.01)
  *B60L 7/12* (2006.01)
  *B60L 11/00* (2006.01)
  *B60L 11/18* (2006.01)
  *B60L 15/20* (2006.01)
  *B60L 7/08* (2006.01)

(52) U.S. Cl.
  CPC ........ *B60L 2240/12* (2013.01); *B60L 2240/421* (2013.01); *B60L 2240/423* (2013.01); *B60L 2250/24* (2013.01); *B60L 2270/145* (2013.01); *Y02T 10/642* (2013.01); *Y02T 10/7005* (2013.01); *Y02T 10/705* (2013.01); *Y02T 10/7044* (2013.01); *Y02T 10/7275* (2013.01)

(56) References Cited

U.S. PATENT DOCUMENTS

| | | | | |
|---|---|---|---|---|
| 4,627,519 | A | * | 12/1986 | Larsen et al. ............ 188/1.11 R |
| 5,951,116 | A | * | 9/1999 | Nagasaka et al. ............. 303/14 |
| 6,724,165 | B2 | * | 4/2004 | Hughes ..................... 318/376 |
| 6,910,747 | B2 | * | 6/2005 | Tsunehara .................. 303/152 |
| 2006/0076171 | A1 | * | 4/2006 | Donnelly et al. ........... 180/65.2 |
| 2007/0278853 | A1 | * | 12/2007 | Bayer et al. ................ 303/9.64 |
| 2010/0292882 | A1 | * | 11/2010 | Murata ........................ 701/22 |
| 2011/0074204 | A1 | * | 3/2011 | Kim .............................. 303/3 |
| 2011/0304200 | A1 | | 12/2011 | Saida et al. |
| 2012/0014239 | A1 | | 1/2012 | Nishigata et al. |
| 2012/0053804 | A1 | | 3/2012 | Saida et al. |
| 2012/0241264 | A1 | | 9/2012 | Hosaka et al. |
| 2013/0317679 | A1 | | 11/2013 | Tanaka et al. |

FOREIGN PATENT DOCUMENTS

| | | |
|---|---|---|
| EP | 1 886 913 A2 | 2/2008 |
| EP | 2 039 556 A2 | 3/2009 |
| EP | 2 423 032 A1 | 2/2012 |
| JP | H10-81290 A | 3/1998 |
| JP | 2003-204602 A | 7/2003 |
| JP | 2004-202002 A | 7/2004 |
| JP | 2008-44414 A | 2/2008 |
| JP | 2010-35376 A | 2/2010 |
| JP | 2010-035376 A | 2/2010 |
| JP | 2011-83081 A | 4/2011 |
| JP | 2012-50304 A | 3/2012 |
| JP | 2012-131306 A | 7/2012 |
| TW | 201223795 A1 | 6/2012 |

OTHER PUBLICATIONS

European Search Report dated Dec. 2, 2013, in a counterpart European patent application No. 13004831.7 of the related U.S. Appl. No. 14/017,134.
U.S. Appl. No. 14/017,134, filed Sep. 3, 2013.
European Search Report dated May 18, 2015 in a counterpart European patent application No. 13004482.9.
Taiwanese Office Action dated Dec. 4, 2014, in a counterpart Taiwanese patent application No. 102127140.

* cited by examiner

CONTROLLER FOR DRIVING A MOTOR AND ELECTRIC POWER-ASSISTED VEHICLE

This application claims the benefit of Japanese Application No. 2012-209128, filed in Japan on Sep. 24, 2012, which is hereby incorporated by reference in its entirety.

BACKGROUND OF THE INVENTION

1. Field of the Invention

The present invention relates to regenerative control technology in an electric power-assisted vehicle.

2. Description of Related Art

There are electric power-assisted vehicles, such as electric bicycles assisted by battery power, which use sensors provided on brake levers. The sensors respond to the usage of the brakes by the rider in order to enable regenerative operation of the motor. This stores the kinetic energy of the vehicle into the battery, and improves the travel distance of the vehicle.

There is technology that controls the duty in PWM (Pulse Width Modulation) control so that electric regenerative braking force, generated by the regenerative charging when only one of either of the brakes is used, is smaller than the electric regenerative braking force generated by the regenerative charging when both of the brakes are used together. This way, with a simple configuration and a low cost, the shock is reduced during the start of regenerative charging when only one of either of the brakes is used, and when both brakes are used together, the regeneration value is increased as compared to when only one of either of the brakes is used, which results in a large regenerative braking force generated due to the regenerative charging.

However, there are times when the rider does not necessarily progress from using one brake to using both brakes. Sometimes the rider starts by using both brakes. In such a case, the conventional technology described above generates a sudden and large regenerative braking force, and the rider may feel a shock due to that regenerative braking force. In addition, the relationship between regenerative braking force and rider comfort has not been given careful consideration in the conventional technology described above.

RELATED ART DOCUMENT

Patent Document

Patent Document 1: Japanese Patent Application Laid-Open Publication No. 2010-35376

SUMMARY OF THE INVENTION

Thus, one aspect of the present invention aims at providing a technology for enabling suitable regenerative braking force according to instructions from the rider.

Additional or separate features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, in one aspect, a controller for driving a motor according to the present invention includes: (A) an input part that receives, from each of two brake sensors, a signal indicating that a corresponding brake is in an ON state or a signal indicating that the brake is in an OFF state; (B) a control coefficient computing part computing a control coefficient that determines a value of a control parameter that controls the motor relative to a target value of the control parameter, the target value being a value of the control parameter at which the motor achieves a desired power generation efficiency, the control coefficient computing part increasing the control coefficient along a first slope when a first signal indicating that only one of the brakes is in the ON state is received from the input part, the control coefficient computing part increasing the control coefficient along a second slope when a second signal indicating that both of the brakes are in the ON state is received from the input part, the second slope rising faster than the first slope; and (C) a control part that derives a value of the control parameter in accordance with the target value of the control parameter and the control coefficient computed by the control coefficient computing part, the control part forwarding the derived value of the control parameter to the motor to control driving of the motor.

By implementing these as such, control can be performed so that the regenerative braking force will increase in different forms according to instructions from the rider, resulting in the ability to suppress shocks from sudden regenerative braking force. The maximum value of the control coefficient may be configured.

The control coefficient computing part described above may, when the first signal is received after the second signal is received, lower the control coefficient to a value greater than or equal to the control coefficient when the second signal is received and lower than the control coefficient when the first signal is received after the second signal.

By changing the control coefficient in this way, the regenerative braking force can be changed according to instructions from the rider.

The value greater than or equal to the control coefficient when the second signal is received and lower than the control coefficient when the first signal is received after the second signal is received may be computed from the control coefficient when the second signal is received and the control coefficient when the first signal is received after the second signal is received. The value may be in-between these, or a value may be used that is obtained by dividing those values by any number, for example.

The value greater than or equal to the control coefficient when the second signal is received and lower than the control coefficient when the first signal is received after the second signal is received may be calculated from the control coefficient when the second signal is received. The value may be the same control coefficient as when the second signal is received.

The value may be a value that has increased along the first slope from the control coefficient when the second signal is received. If this is done, then there will be a natural control coefficient curve.

The target value described above may be variable. The target value is sometimes determined according to vehicle speed, and in such a case if regenerative braking force lowers the vehicle speed, then the value itself will also lower, for example. The maximum value of the control coefficient may also be variable with time.

Programs can be created for implementing such processes as described above on a microprocessor, and the programs are stored on a computer readable storage medium or storage device such as a floppy disk, an optical disc such as a CD-ROM, a magneto-optical disc, a semiconductor memory (ROM, for example), or a hard-disk, for example. Half-processed data is temporarily stored in a storage device such as RAM (Random Access Memory).

According to one aspect, proper regenerative braking force is enabled according to the instructions from the rider.

It is to be understood that both the foregoing general description and the following detailed description are exemplary and explanatory, and are intended to provide further explanation of the invention as claimed.

DETAILED DESCRIPTION OF THE PREFERRED EMBODIMENTS

Embodiment 1

Figure 1:
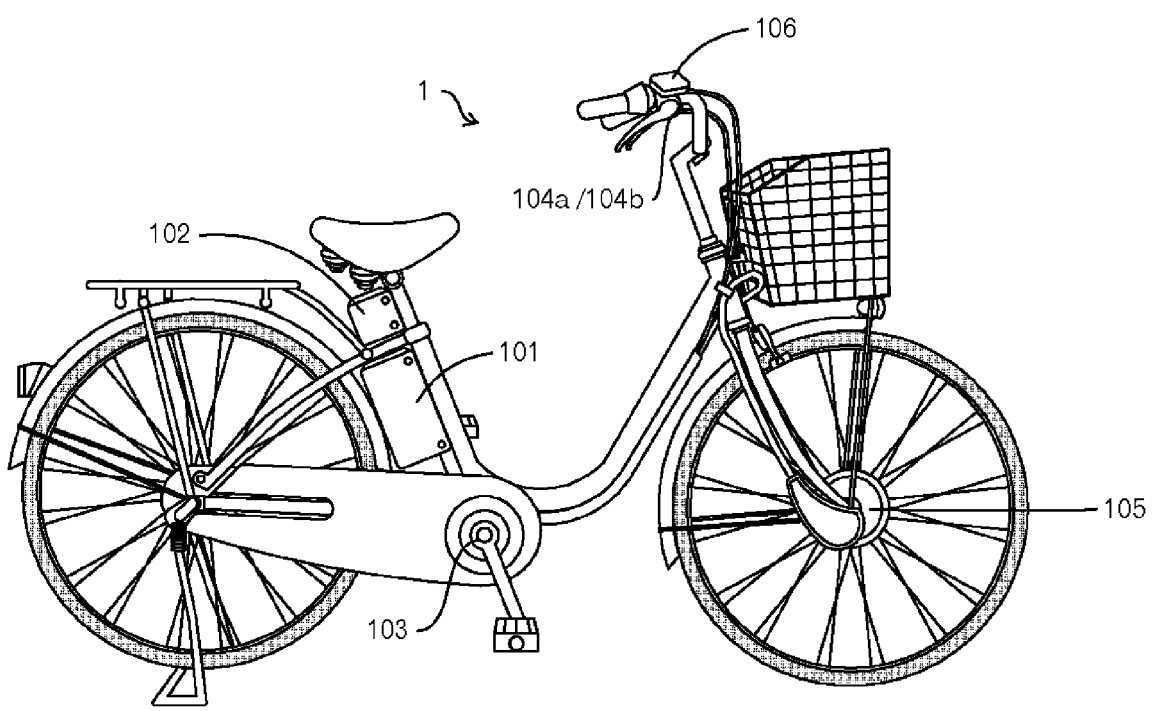
FIG. 1 is an external appearance of a motor-assisted bicycle.

FIG. 1 is an external view of one example of a motor-assisted bicycle, which is an electric power-assisted vehicle, in the present embodiment. This motor-assisted bicycle 1 is equipped with a motor driver device. The motor driver device has a rechargeable battery 101, a controller for driving a motor 102, a torque sensor 103, brake sensors 104a and 104b, a motor 105, and an operation panel 106.

The rechargeable battery 101 is a lithium ion rechargeable battery with a maximum supply voltage (the voltage when fully charged) of 24V, for example. However, other types of batteries, such as a lithium ion polymer rechargeable battery, a nickel-hydrogen storage battery, or the like may also be used, for example.

The torque sensor 103 is provided on the wheel installed on the crankshaft, and detects the pedal force of the rider and outputs these detection results to the controller for driving a motor 102.

Figure 2:
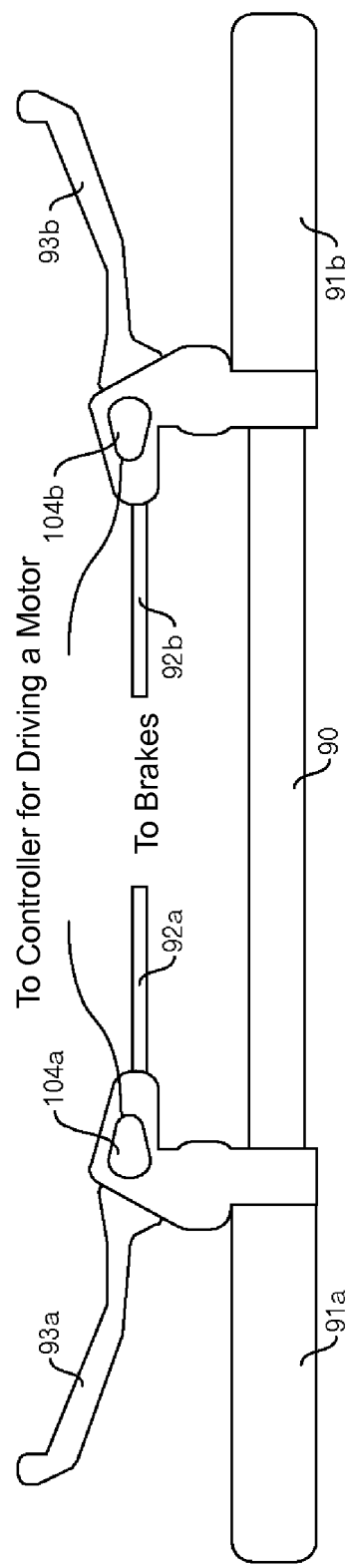
FIG. 2 is a view for explaining brake sensors.

As shown in FIG. 2, the brake sensor 104a is in an ON state when a grip 91a and a brake lever 93a provided on the left end of a handle part 90 are gripped to a certain degree, and then a signal indicating this ON state is transmitted to the controller for driving a motor 102. A brake wire 92a is pulled to the degree to which the grip 91a and the brake lever 93a are gripped, and the rear wheel mechanically brakes, for example.

The brake sensor 104b is also configured to be in an ON state when a grip 91b and a brake lever 93b are gripped to a certain degree, and a signal indicating this ON state is then transmitted to the controller for driving a motor 102. A brake wire 92b is pulled according to the degree to which the grip 91b and brake lever 93b are gripped, and the front wheel mechanically brakes, for example.

More specifically, the brake sensors 104a and 104b are made of a magnet and a well-known reed switch, for example. The magnet is attached to the brake wires 92a and 92b connected to the brake levers 93a and 93b, in a casing that affixes the brake levers 93a and 93b and through which the brake wires 92a and 92b pass. The brake levers 93a and 93b turn the reed switch to an ON state when gripped by hand. The reed switch is affixed inside the casing. This reed switch signal is sent to the controller for driving a motor 102. The configuration of the brake sensors 104a and 104b is not limited to such a method, and may be a method that optically detects brake operation, a method that detects brake operation using a mechanical switch, a method that detects brake operation by changes in electrical resistance, or the like.

The motor 105 is a three-phase brushless DC motor with a well-known configuration, for example, and is installed on the front wheel of the motor-assisted bicycle 1, for example. The motor 105 rotates the front wheel, and a rotor is connected to the front wheel so that the rotor rotates according to the rotation of the front wheel. The motor 105 has a rotation sensor such as a Hall element to output rotation information (in other words, the Hall signal) of the rotor to the controller for driving a motor 102.

The operation panel 106 receives instruction input about the use of assistance from the rider, and outputs this instruction input to the controller for driving a motor 102, for example. The operation panel 106 receives configuration input of the assist ratio (also called the desired assist ratio) from the rider, and outputs the configuration input to the controller for driving a motor 102. There are also times when a signal indicating the transmission gear ratio is outputted to the controller for driving a motor 102 from the transmission or the like.

Figure 3:
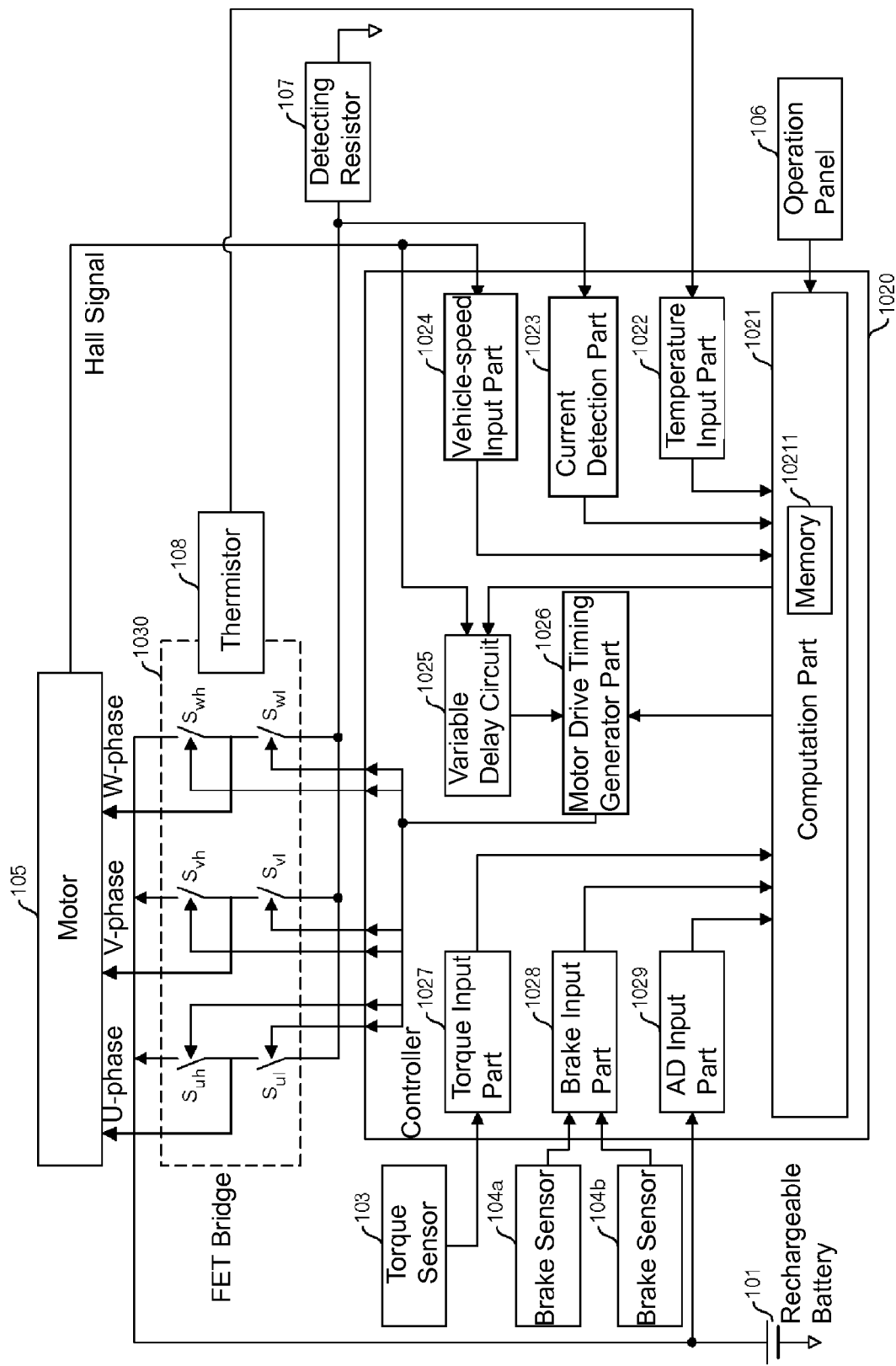
FIG. 3 is a function block diagram of a controller for driving a motor.

A configuration relating to such a controller for driving a motor 102 of the motor-assisted bicycle 1 is shown in FIG. 3. The controller for driving a motor 102 has a controller 1020 and a FET (Field Effect Transistor) bridge 1030. The FET bridge 1030 contains: a high-side FET ($S_{uh}$) and a low-side FET ($S_{ul}$) that perform U-phase switching for the motor 105, a high-side FET ($S_{vh}$) and a low-side FET ($S_{vl}$) that perform V-phase switching for the motor 105, and a high-side FET ($S_{wh}$) and a low-side FET ($S_{wl}$) that perform W-phase switching for the motor 105. This FET bridge 1030 forms part of a complementary switching amp.

The controller 1020 has a computation part 1021, a temperature input part 1022, a current detection part 1023, a vehicle-speed input part 1024, a variable delay circuit 1025, a motor drive timing generator part 1026, a torque input part 1027, a brake input part 1028, and an AD input part 1029.

The computation part 1021 uses input from the operation panel 106 (ON/OFF and operation mode (such as assist ratio) for example), input from the current detection part 1023, input from the vehicle-speed input part 1024, input from the torque input part 1027, input from the brake input part 1028, and input from the AD input part 1029 to perform computations as described below, and then outputs the result to the motor drive timing generator part 1026 and the variable delay circuit 1025. The computation part 1021 has a memory 10211, and the memory 10211 stores various data, half-processed data, and the like for use in the computations. The computation part 1021 may be realized by programs executed by a processor, and in such a case the programs may be recorded in the memory 10211.

The current detection part 1023 uses a detecting resistor 107 that detects current flowing to the FETs on the FET bridge 1030, and digitizes the voltage value according to the current, and outputs the value to the computation part 1021. The vehicle-speed input part 1024 computes the current vehicle speed and rotation cycle of the rear wheel using the Hall signal outputted by the motor 105, and outputs the result to the computation part 1021. The torque input part 1027 digitizes a signal corresponding to the force from the torque sensor 103, and outputs the result to the computation part 1021. The brake input part 1028 outputs a signal to the computation part 1021, according to a signal from the brake sensors 104a and 104b indicating: a no-brake state where no ON signal has been received from either of the brake sensors 104a and 104b; a one-brake state where an ON signal has been received from only one of either of the brake sensors 104a and 104b; or a two-brake state where an ON signal has been received from both of the brake sensors 104a and 104b. The AD (Analog-Digital) input part 1029 digitizes the output voltage from the rechargeable battery 101 and outputs the result to the computation part 1021. The memory 10211 may be provided separately from the computation part 1021.

The computation part 1021 outputs a lead angle value as a result of the computations to the variable delay circuit 1025. The variable delay circuit 1025 adjusts the phase of the Hall signal on the basis of the lead angle value received from the computation part 1021, and outputs the result to the motor drive timing generator part 1026. As a result of the computations, the computation part 1021 outputs a PWM (Pulse Width Modulation) code, which corresponds to the duty ratio of the PWM, to the motor drive timing generator part 1026, for example. The motor drive timing generator part 1026 generates and outputs switching signals for every FET contained on the FET bridge 1030 on the basis of the post-adjusted Hall signal from the variable delay circuit 1025 and the PWM code from the computation part 1021.

Figure 4:
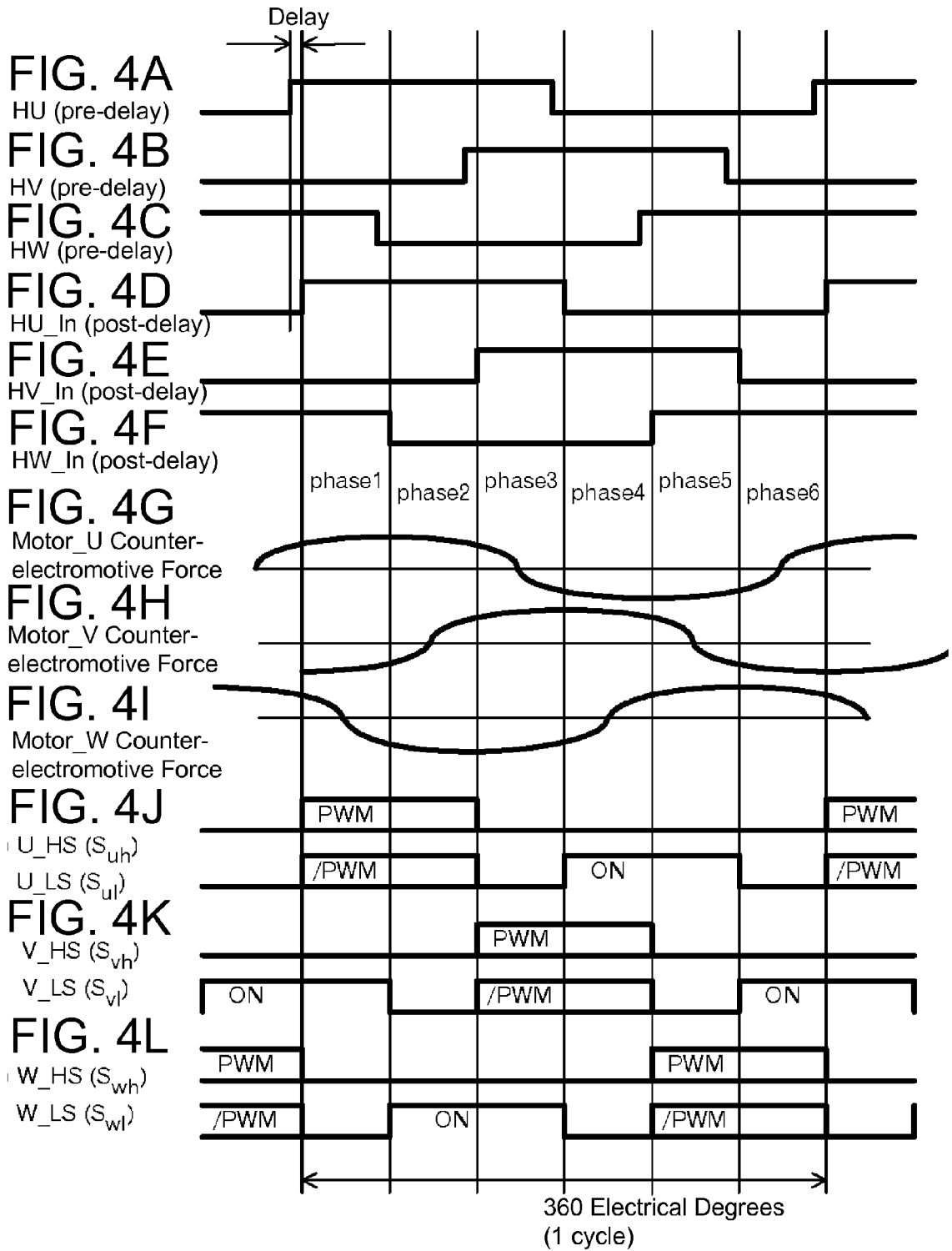
FIGS. 4A to 4L are waveform diagrams for explaining the basic operation of motor driving.

FIGS. 4A to 4L will be used to explain the basic motor drive operation with the configuration shown in FIG. 3. FIG. 4A indicates a U-phase Hall signal HU outputted by the motor 105, FIG. 4B indicates a V-phase Hall signal HV outputted by the motor 105, and FIG. 4C indicates a W-phase Hall signal HW outputted by the motor 105. As such, the Hall signal indicates the rotation phase of the motor. The rotation phase is not necessarily obtained as a continuous value here, and may be set to be obtained by other sensors or the like. As also described below, in the present embodiment the Hall element of the motor 105 is placed so the Hall signal, as shown in FIG. 4, is outputted at a slightly advanced phase, and is adjustable by the variable delay circuit 1025. Therefore, a post-adjusted U-phase Hall signal HU_In as shown in FIG. 4D is outputted from the variable delay circuit 1025 to the motor drive timing generator part 1026, a post-adjusted V-phase Hall signal HV_In as shown in FIG. 4E is outputted from the variable delay circuit 1025 to the motor drive timing generator part 1026, and a post-adjusted W-phase hole signal HW_In as shown in FIG. 4F is outputted from the variable delay circuit 1025 to the motor drive timing generator part 1026.

One Hall signal cycle is divided into six phases of 360 electrical degrees.

As shown in FIGS. 4G to 4I, counter-electromotive force voltages occur such as a Motor_U counter-electromotive force at the U-phase terminal, a Motor_V counter-electromotive force at the V-phase terminal, and a Motor_W counter-electromotive force at the W-phase terminal. In order to drive the motor 105 with driving voltage that matches the phases of the motor counter-electromotive force voltages, a switching signal as shown in FIGS. 4J to 4L is outputted to the gate of every FET on the FET bridge 1030. U_HS in FIG. 4J represents the gate signal for the U-phase high-side FET ($S_{uh}$) and U_LS represents the gate signal for the U-phase low-side FET ($S_{ul}$). PWM and /PWM represent the ON/OFF period in a duty ratio according to the PWM code, which is the computational result from the computation part 1021. Since this is a complementary type, if PWM is ON then /PWM is OFF, and if PWM is OFF then /PWM is ON. The ON area of the low-side FET ($S_{ul}$) is always ON. VHS in FIG. 4K represents a gate signal of the V-phase high-side FET ($S_{vh}$), and V_LS represents a gate signal of the V-phase low-side FET ($S_{vl}$). The meaning of the characters is the same as in FIG. 4J. W_HS in FIG. 4L represents a gate signal of the W-phase high-side FET ($S_{wh}$), and W_LS represents a gate signal of the W-phase low-side FET ($S_{wl}$). The meaning of the characters is the same as in FIG. 4J.

As such, the U-phase FETs ($S_{uh}$ and $S_{ul}$) perform PWM switching in phase 1 and 2, and the U-phase low-side FET ($S_{ul}$) turns ON in phase 4 and 5. The V-phase FETs ($S_{vh}$ and $S_{vl}$) perform PWM switching in phase 3 and 4, and the V-phase low-side FET ($S_{vl}$) turns on in phase 6 and 1. The W-phase FETs ($S_{wh}$ and $S_{wl}$) perform PWM switching in phase 5 and 6, and the W-phase low-side FET ($S_{wl}$) turns ON in phase 2 and 3.

If such signals are outputted to suitably control the duty ratio, then the motor 105 can be driven at the desired torque.

Figure 5:
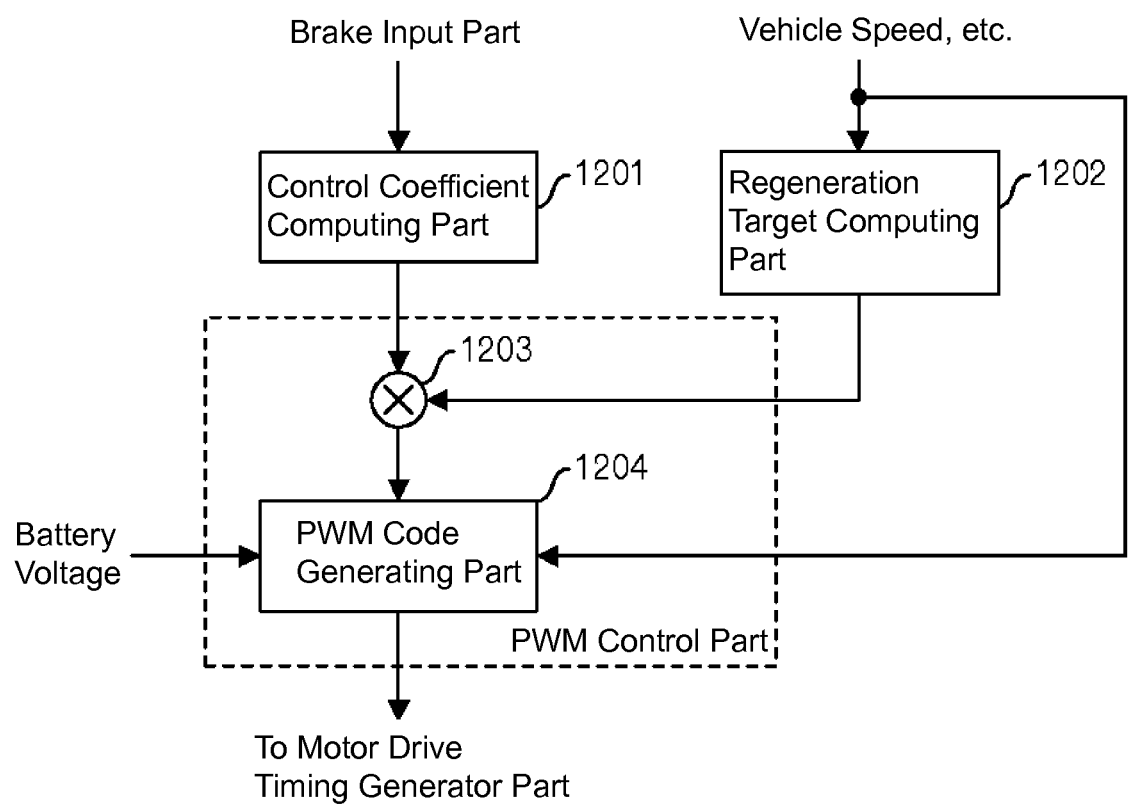
FIG. 5 is a function block diagram of a computation part.

Next, a function block diagram of the computation part 1021 is shown in FIG. 5. The computation part 1021 has a control coefficient computing part 1201, a regeneration target computing part 1202, a multiplier 1203, and a PWM code generating part 1204. The multiplier 1203 and the PWM code generating part 1204 operate as the PWM control part.

The control coefficient computing part 1201 computes the control coefficient, as described below, according to the input from the brake input part 1028, and outputs the result to the multiplier 1203. The regeneration target computing part 1202 computes the regeneration target value according to the vehicle speed and the like from the vehicle-speed input part 1024, and outputs the result to the multiplier 1203. The multiplier 1203 multiplies the control coefficient and the regeneration target value and outputs the result of the multiplying to the PWM code generating part 1204. The PWM code generating part 1204 generates a PWM code corresponding to the PWM duty ratio based on the output from the multiplier 1203, the vehicle speed, and the like, and outputs the PWM code to the motor drive timing generating part 1026.

Figure 6A:
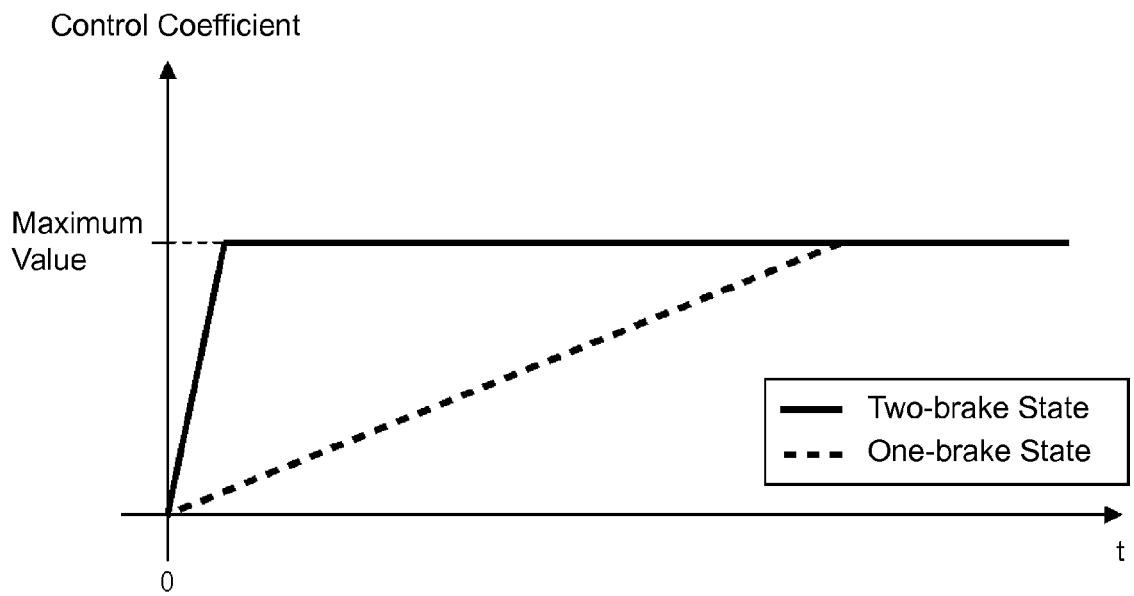
FIG. 6A is a view showing a time lapse of a control coefficient.

In the present embodiment, the control coefficient computing part 1201 basically outputs control coefficients as shown in FIG. 6A. In FIG. 6A the Y-axis represents the control coefficient and the X-axis represents time. If a signal indicating the two-brake state is received at time 0 and the signal continues, then the control coefficient, as represented by the bold line, will rise along slope β over time until it reaches the maximum value of the control coefficient, for example. When the maximum value of the control coefficient is reached, the control coefficient is maintained at the maximum value while the signal representing the two-brake state continues to be received. However, if a signal indicating the one-brake state is received at time 0 and the signal continues, then the control coefficient, as represented by the dotted line, will rise along slope α (β>α) over time until it reaches the maximum value of the control coefficient.

As such, in the present embodiment, regenerative braking is not immediately performed with power commensurate with the braking state, but rather the control coefficient is gradually increased, thereby avoiding problems relating to ride quality such as shocks caused by sudden and powerful regenerative braking, and the like.

Figure 6B:
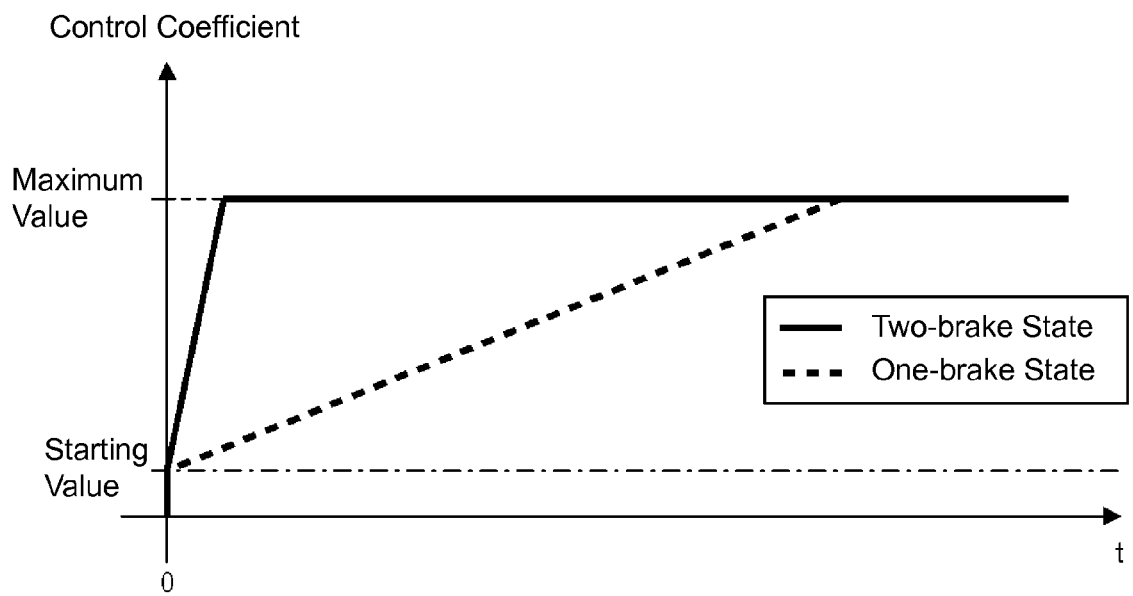
FIG. 6B is a view showing another example of a time lapse of the control coefficient.

Sometimes, as shown in FIG. 6B, the control coefficient is given a starting value, for example. This is to ensure that the operator can recognize the regenerative start as the start of the regenerative operation, to a certain degree. Therefore, this starting value is a set value regardless of whether there is a two-brake start or a one-brake start.

In the present embodiment, the ultimate maximum values for the control coefficient of the two-brake state and the one-brake state are the same, but the length of time it takes for the regenerative braking to reach the maximum is different due to a magnitude relationship being established for the slopes leading to the maximum value. In other words, the control coefficient in the two-brake state reaches the maximum value in a short amount of time, so a state in which the regenerative braking is strong continues longer, and the regenerative braking itself becomes more powerful. There is also more regenerative power. Meanwhile, it takes more time for the control coefficient in the one-brake state to reach the maximum value, and the regenerative braking also takes time to become more powerful. As such, by differentiating the magnitude of the regenerative braking according to instructions from the rider, it is possible to implement a braking that responds to the intentions of the rider.

In the present embodiment, the maximum value of the control coefficient is assumed to be "1", but a numerical value greater than "1" may be used as well. Depending on the circumstance, the maximum value of the control coefficient may be variable with time.

Figure 7A:
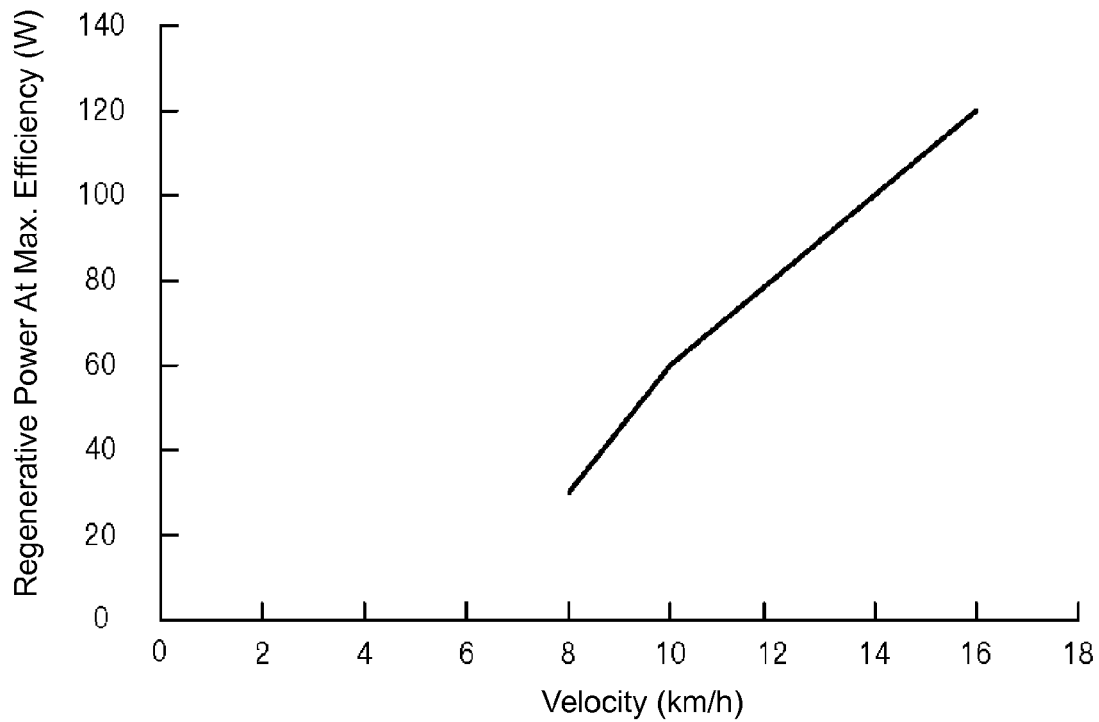
FIG. 7A is a view showing the most efficient maximum power for the given speeds.
Figure 7B:
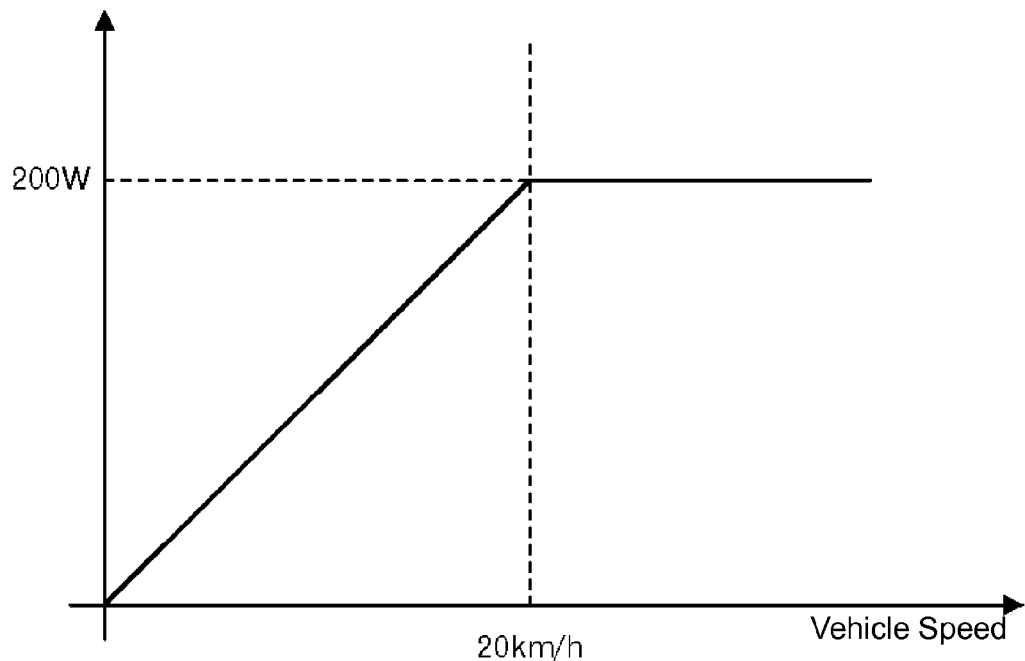
FIG. 7B is a view showing the relationship between speed and regeneration target value.

The regeneration target computing part 1202 computes the regeneration target value according to vehicle speed and the like. As shown in FIG. 7A, for each vehicle speed, for example, there is a set power that the motor generates power at where regeneration efficiency is the greatest. As shown in FIG. 7B, it is preferable to configure the regeneration target value according to the vehicle speed so that the motor generates power where regeneration efficiency is the greatest as such, for example. In the present specification, the regeneration target value is a parameter value for motor control when the motor is in a regeneration state (in other words, a power generation state), and this parameter value derives the drive state of the motor, such as when the power generation (regeneration) efficiency of the motor reaches maximum (or reaches a desired generation efficiency). In this regeneration state, the parameter for motor control used in the computations of the PWM code generating part 1204 is configured, such as the power needed to control the motor for such optimum generation efficiency; the duty ratio; the torque generated by the motor; the electric current amount flowing from the motor to the battery, and the like. If the calculations are done in torque units, then a relationship between the torque generated by the motor and vehicle speed that results in the maximum regeneration efficiency (generation efficiency) is identified ahead of time, and the regeneration target computing part 1202 computes the torque target value according to the current vehicle speed, for example. If the vehicle speed decreases due to braking, then the regeneration target value also decreases.

The multiplier 1203 multiplies a control coefficient C outputted from the control coefficient computing part 1201 with a regeneration target value V outputted from the regeneration target computing part 1202, and outputs C×V to the PWM code generating part 1204. The PWM code generating part 1204 generates a PWM code based on the duty ratio and according to the vehicle speed and the like and C×V. If V is torque, for example, then C×V will also be torque, so the torque is converted into the PWM code by a conversion coefficient or the like, for example, based on the torque C×V and the torque according to the vehicle speed.

FIG. 6A shows an example of change in the control coefficient for a very simple brake operation. Actual braking operations are more complex.

In the present embodiment, there are times when the two-brake state is transitioned to from the one-brake state, and then the one-brake state is transitioned to again, and also times when the one-brake state is transitioned to from the two-brake state, for example.

Figure 8:
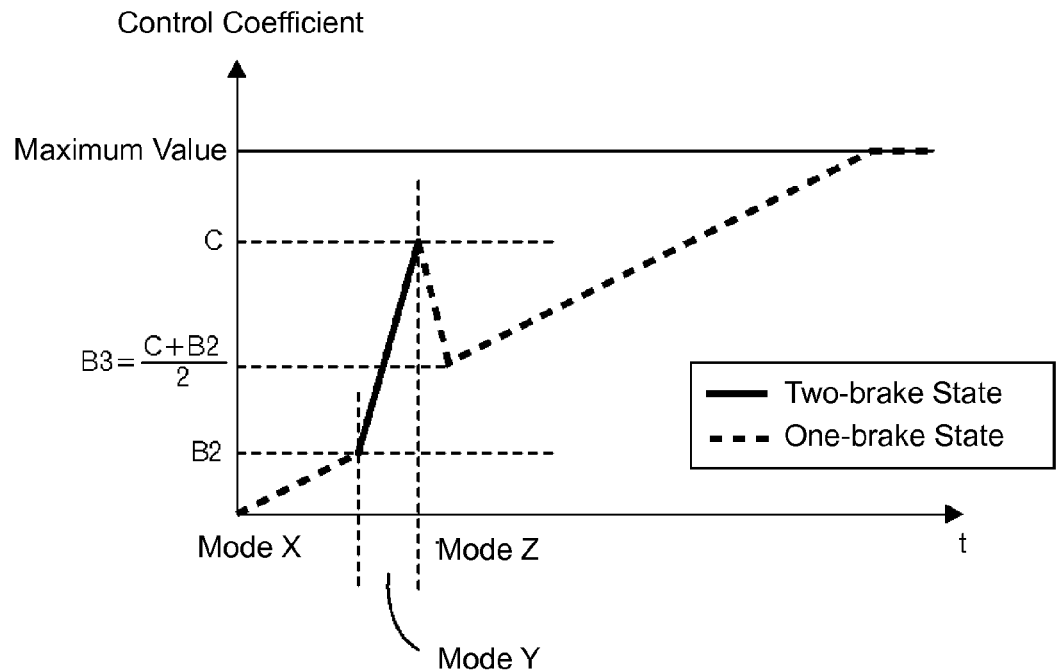
FIG. 8 is a view showing one example of time lapse of the control coefficient.

If the former, there is a possibility of change in the control coefficient occurring as shown in FIG. 8, for example. In other words, in the one-brake state the control coefficient increases along slope α, and when the two-brake state is transitioned to, the control coefficient increases along slope β. However, if the rider returns to the one-brake state before the maximum value is reached, then in the present embodiment the control coefficient decreases along slope γ so as to return to reascension point B3={the control coefficient C immediately before transitioning to the one-brake state+a control coefficient B2 immediately before transitioning to the two-brake state}/2. When the control coefficient returns to reascension point B3={C+B2}/2, the control coefficient increases again along slope α. In the present embodiment, mode Y is the two-brake state, mode X is the one-brake state before transitioning to the two-brake state, and mode Z is when the one-brake state has been transitioned to after having transitioned to the two-brake state.

Figure 9:
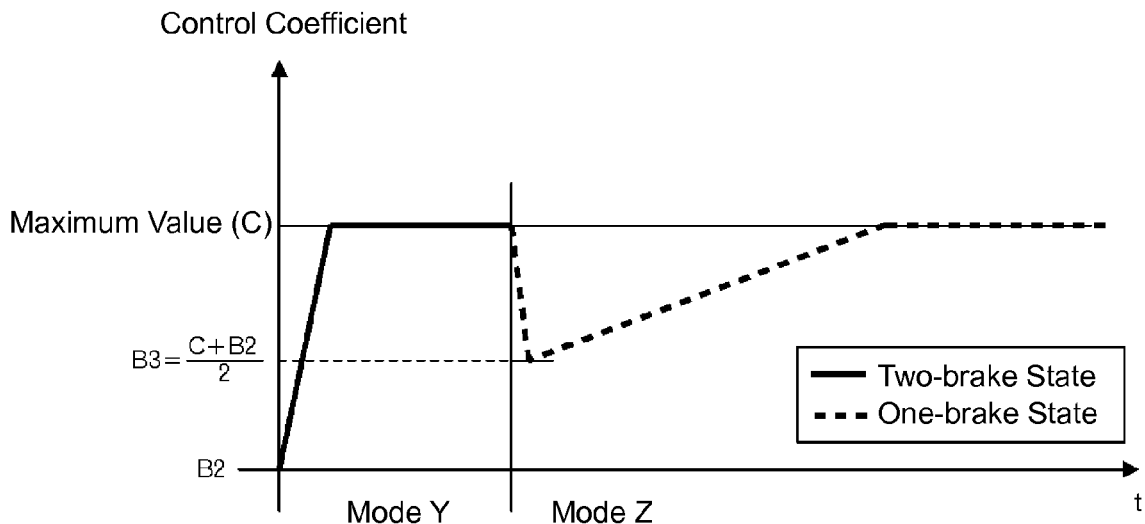
FIG. 9 is a view showing one example of time lapse of the control coefficient.

If the latter, there is a possibility of change in the control coefficient occurring as shown in FIG. 9, for example. In other words, in the two-brake state the control coefficient increases along slope β, and is maintained at the maximum value after the control coefficient reaches the maximum value. Then, if the rider transitions to the one-brake state, in the present embodiment the control coefficient decreases along slope γ so as to return to reascension point B3={the control coefficient C (the current control coefficient) immediately before transitioning to the one-brake state+the control coefficient B2=0 immediately before transitioning to the two-brake state}/2. When the control coefficient returns to reascension point B3={C+B2}/2, the control coefficient increases again along slope α, and then reaches the maximum value. As also described above, mode Y is the two-brake state, and mode Z is when the one-brake state has been transitioned to after having transitioned to the two-brake state.

Figure 10:
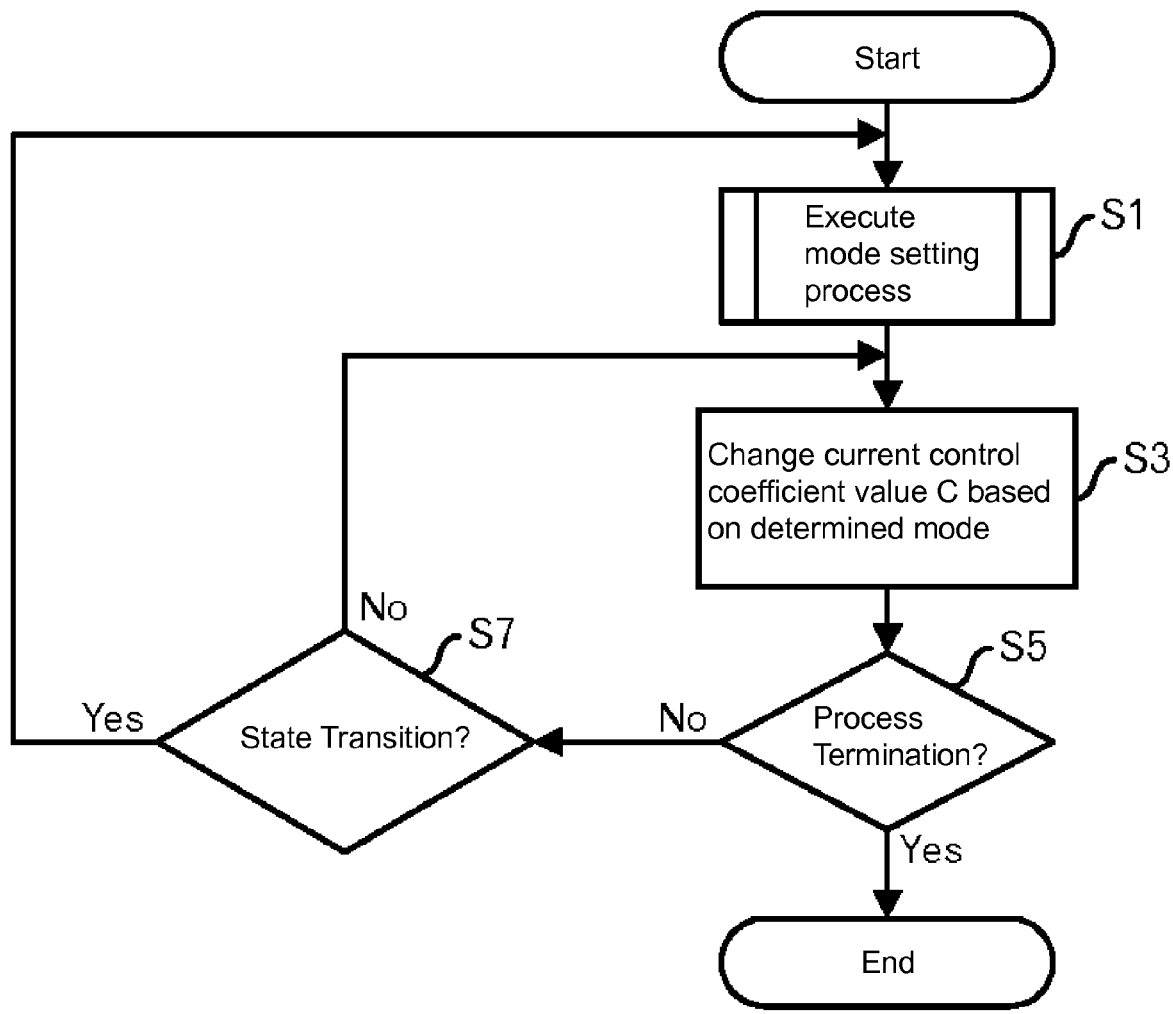
FIG. 10 is a view showing a main process flow according to Embodiment 1.
Figure 11:
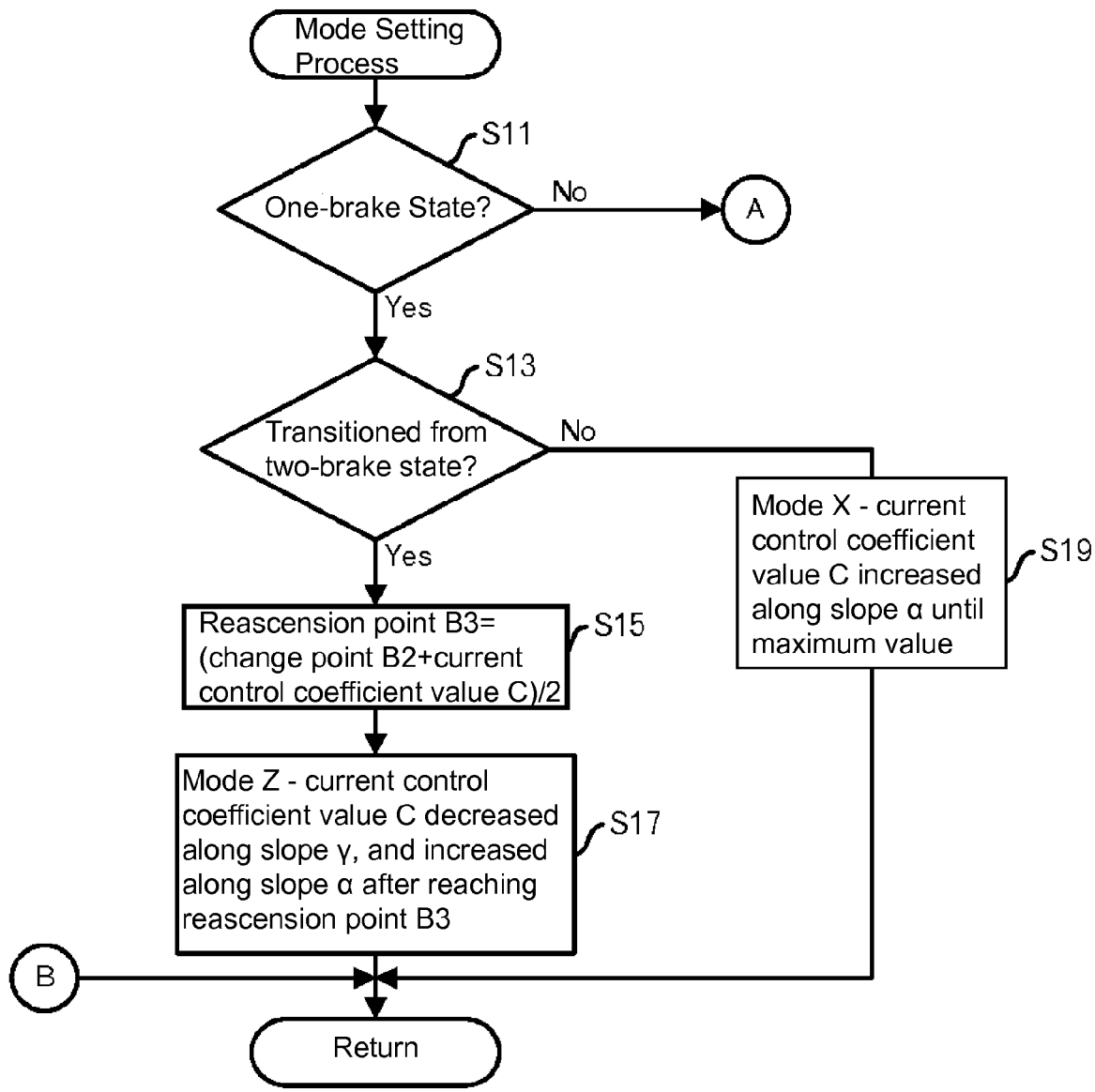
FIG. 11 is a view showing a process flow of a mode setting process according to Embodiment 1.
Figure 12:
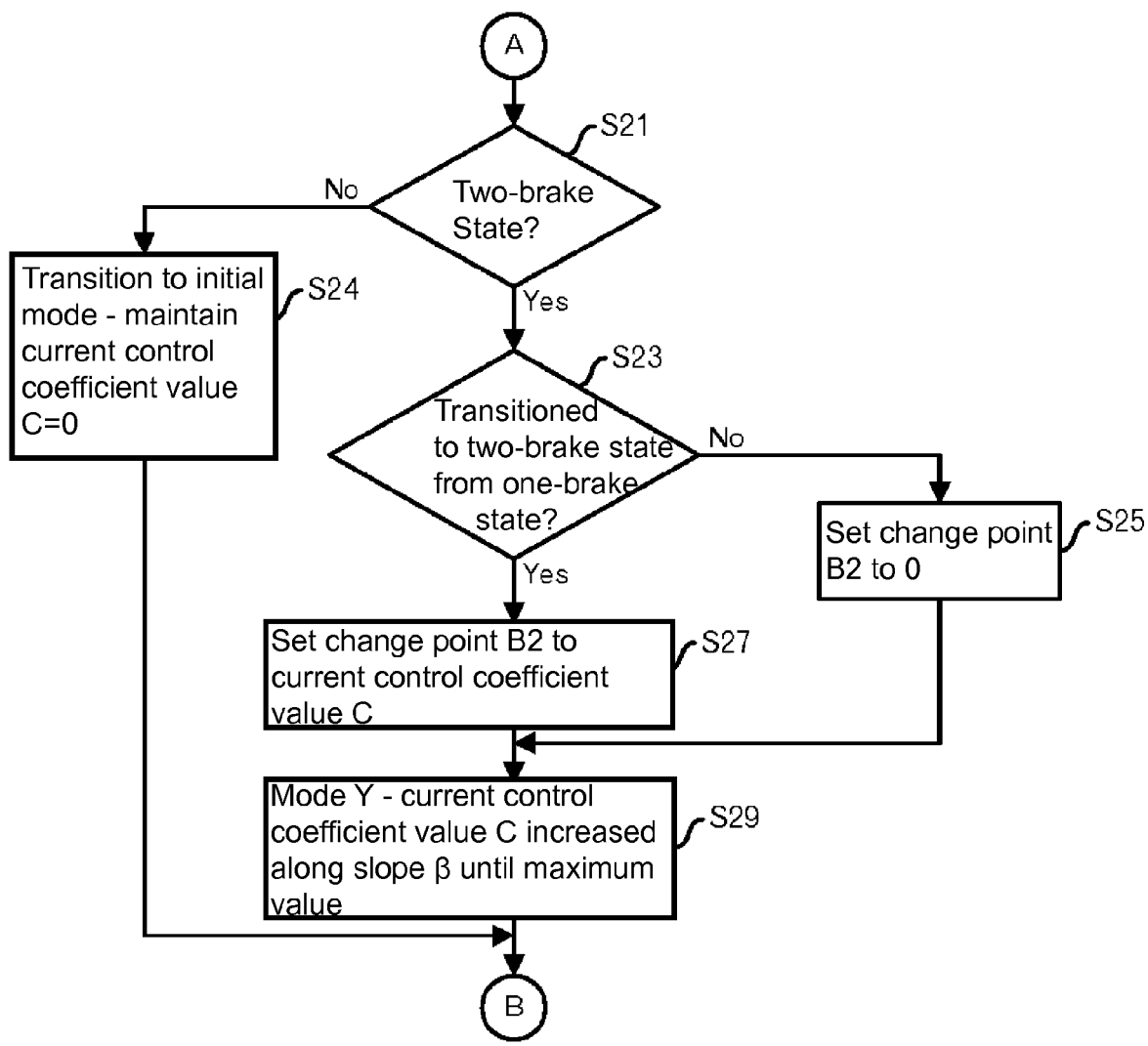
FIG. 12 is a view showing a process flow of a mode setting process according to Embodiment 1.

FIGS. 10 to 12 are used to explain the processing content of the control coefficient computing part 1201 in order to compute such a control coefficient.

The drawings assume initial operation in the no-brake state. The control coefficient computing part 1201 executes the mode setting process (FIG. 10: step S1). The mode setting process is explained using FIGS. 11 to 12.

The control coefficient computing part 1201 determines if the vehicle is currently in the one-brake state (step S11). If not in the one-brake state, the control coefficient computing part 1201 moves to the processes in FIG. 12 via a terminal A. The processes after the terminal A relate to the processes in FIG. 11, so the processes after the terminal A will be explained first.

When the process in FIG. 12 is moved to, the control coefficient computing part 1201 determines whether the vehicle is in the two-brake state (step S21). If not in the two-brake state, then the vehicle is in the no-brake state. Therefore, the control coefficient computing part 1201 transitions to an initial mode that maintains the current control coefficient C=0 (step S24). Then, the control coefficient computing part 1201 returns to the processes in FIG. 10 via a terminal B, and further returns to the calling source process.

However, if in the two-brake state, the control coefficient computing part 1201 determines if the two-brake state has been transitioned to from the one-brake state (step S23). If the vehicle has not transitioned from the one-brake state to the two-brake state, but rather has transitioned from the no-brake state to the two-brake state, then the control coefficient computing part 1201 sets a change point B2 to 0 (step S25), and step S29 of the processes is moved to. Step S25 corresponds to the left portion of FIG. 9, for example.

However, if the vehicle has transitioned from the one-brake state to the two-brake state, then the control coefficient computing part 1201 sets the change point B2 to the current control coefficient C (step S27). Step S27 corresponds to the transition to mode Y in FIG. 8, for example.

The control coefficient computing part 1201 transitions to mode Y, where the current control coefficient C is maintained at the maximum value after the current control coefficient C is increased until reaching the maximum value along slope β (step S29). Then, the control coefficient computing part 1201 returns to the processes in FIG. 10 via the terminal B, and further returns to the calling source process. As such, when the two-brake state is transitioned to, the control coefficient is outputted in mode Y.

Returning to the description of the processes in FIG. 11, if in the one-brake state, the control coefficient computing part 1201 determines whether or not the one-brake state has been transitioned to from the two-brake state (step S13). If there has been no transition from the two-brake state and the vehicle has been in the one-brake state from the start, then the control coefficient computing part 1201 transitions to mode X, where the current control coefficient C is maintained at the maximum value after the current control coefficient C is increased until reaching the maximum value along slope α (<β) (step S19). Then, the calling source process is returned to. As such, if the vehicle has been in the one-brake state from the start, then the control coefficient will be outputted in mode X.

However, if the one-brake state is returned to from the two-brake state, then as shown in FIGS. 8 and 9, the control coefficient will be decreased.

Therefore, the control coefficient computing part 1201 calculates the value of the reascension point B3 by the reascension point B3=(the change point B2+current control coefficient C)/2 (step S15). The control coefficient computing part 1201 then transitions to mode Z, where the current control coefficient C is decreased along slope γ (negative value) and, after reaching the reascension point B3, is increased along slope α (step S17). By doing this, a change in the control coefficient is obtainable corresponding to the dotted line in the latter half of FIGS. 8 and 9. The control coefficient in mode Z does not increase above the maximum value.

Returning to the explanation of the processes in FIG. 10, the control coefficient computing part 1201 modifies the current control coefficient C according to the determined mode (step S3). In mode X, the control coefficient C increases by the coefficient value a, which increases per unit of time. In mode Y, the control coefficient C increases by the coefficient value α, which increases per unit of time. In mode Z, the control coefficient C decreases by the coefficient value γ, which decreases per unit of time, until reaching reascension point B3, or the control coefficient C increases by the coefficient value a, which increases per unit of time, after reaching reascension point B3. However, the control coefficient C does not increase above the maximum value. The control coefficient C does not go below the minimum value (0, for example).

The control coefficient computing part 1201 determines if process termination has been indicated (step S5). The process is terminated if there is a process termination event, such as the power supply being set to OFF, or the like, for example. However, if there is no process termination, then the control coefficient computing part 1201 determines whether a state transition in the brake state has been detected (step S7). If there is no state transition present then the process returns to step S3. However, if there is a state transition present then the process returns to step S1.

By executing processes such as those described above, moment by moment computations are done for suitable control coefficients.

If the regeneration target value is constant, for example, then the curve shown in FIGS. 8 and 9 expresses the time lapse in the output of the multiplier 1203 as is. However, as described above, if the vehicle speed decreases, the regeneration target value will also decrease, so in general the curve will become lower than the curve shown in FIGS. 8 and 9 over time.

Embodiment 2

In Embodiment 1, the average value of the current control coefficient C at the time of transitioning from the two-brake state to the one-brake state, and the change point B2, is set to be the reascension point B3. Depending on slope γ, there is a tendency for a relatively large control coefficient to be set as the reascension point B3. This means the slowdown of the vehicle is not lessened as much as the rider expects, despite only using one brake.

Figure 13:
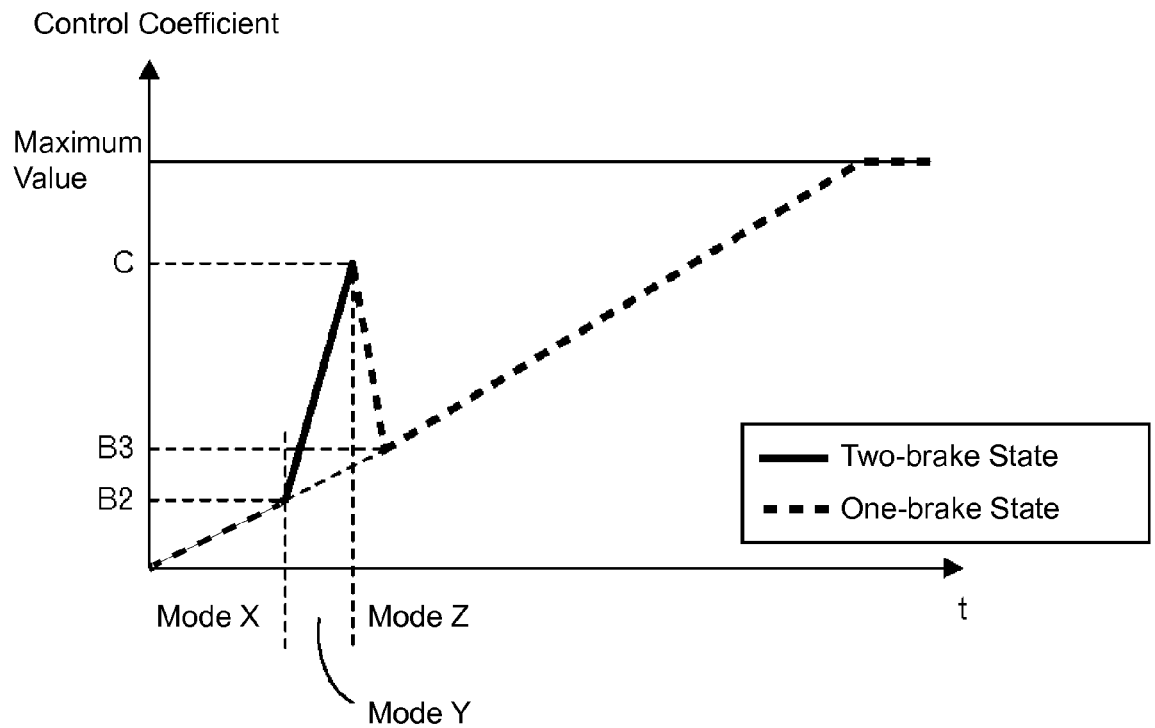
FIG. 13 is a view showing one example of a time lapse of a control coefficient according to Embodiment 2.

For this reason, there are times when it is preferable for a control coefficient to be changed as shown in FIG. 13, for example. In the example in FIG. 13, in a one-brake state a control coefficient increases along slope α, and when a two-brake state is transitioned to, the control coefficient increases along slope β. However, if the one-brake state is returned to before reaching a maximum value, then in the present embodiment the reascension point B3 is set as the intersection of a half-line that increases along slope α from a control coefficient B2 immediately before a transition to the two-brake state, and a half-line that decreases along slope γ from a control coefficient C (=B1) immediately before a transition to the one-brake state. In the present embodiment, mode Y is the two-brake state, mode X is the one-brake state before transitioning to the two-brake state, and mode Z is when the one-brake state has been transitioned to after having transitioned to the two-brake state.

Figure 14:
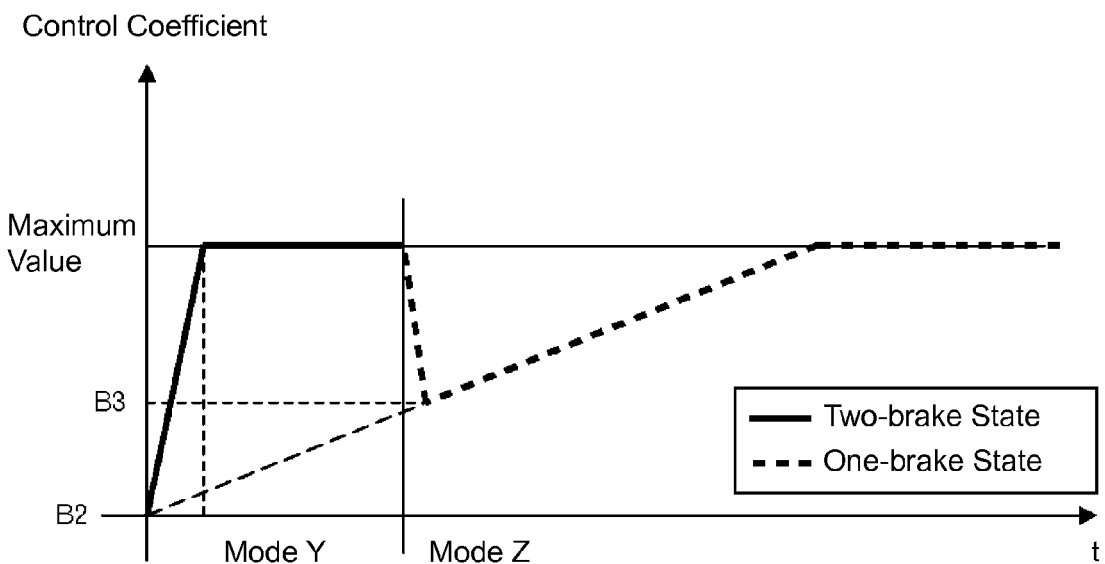
FIG. 14 is a view showing one example of a time lapse of the control coefficient according to Embodiment 2.

In the example in FIG. 14, the vehicle is in the two-brake state from the start, so mode Y is started from. Then the one-brake state is transitioned to, so mode Z is used. After the reascension point B3, the line increases along slope α, and the maximum value is maintained after reaching the maximum value.

Figure 15:
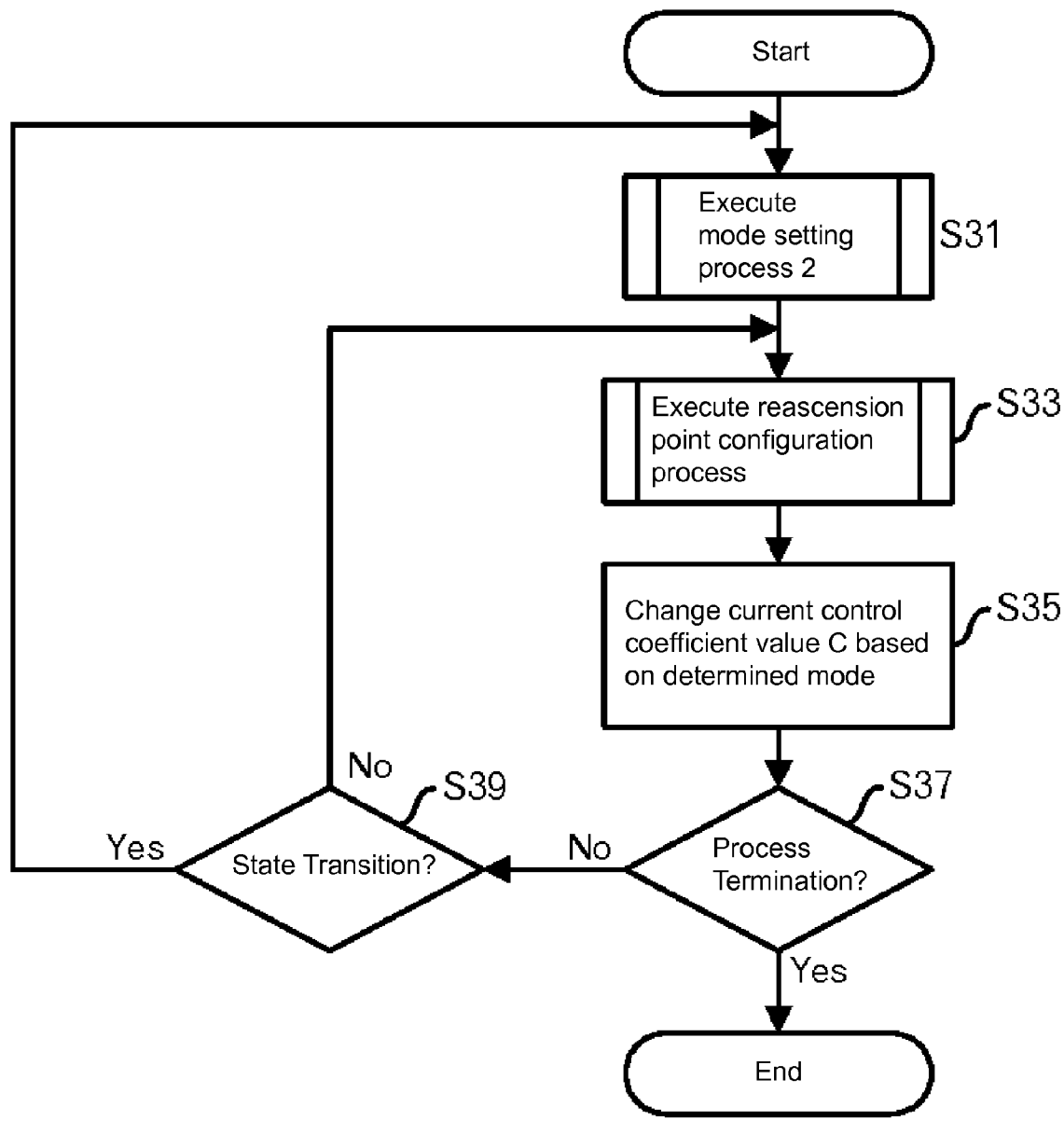
FIG. 15 is a view showing a main process flow according to Embodiment 2.
Figure 16:
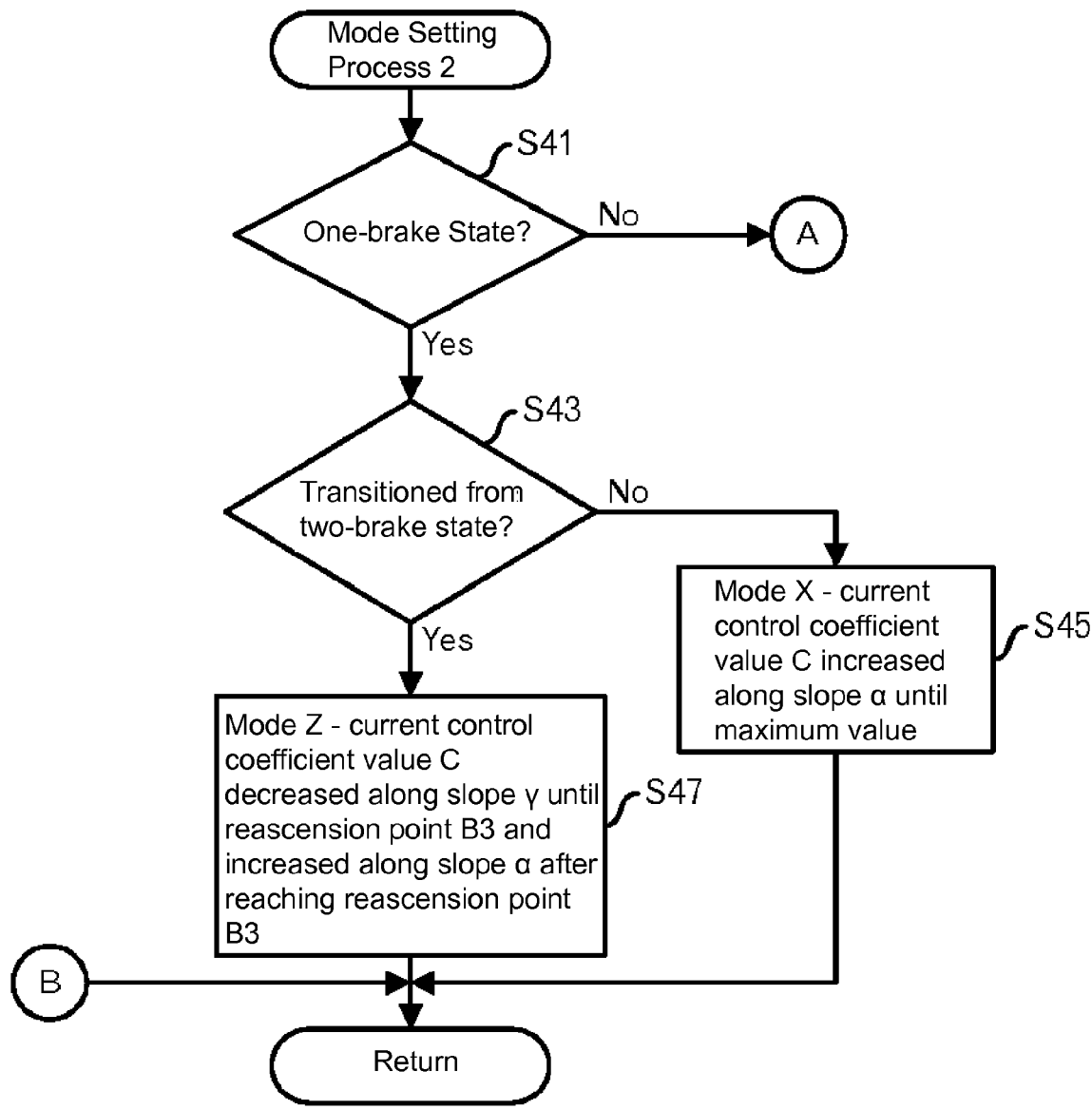
FIG. 16 is a view showing a process flow of a mode setting process 2 according to Embodiment 2.
Figure 17:
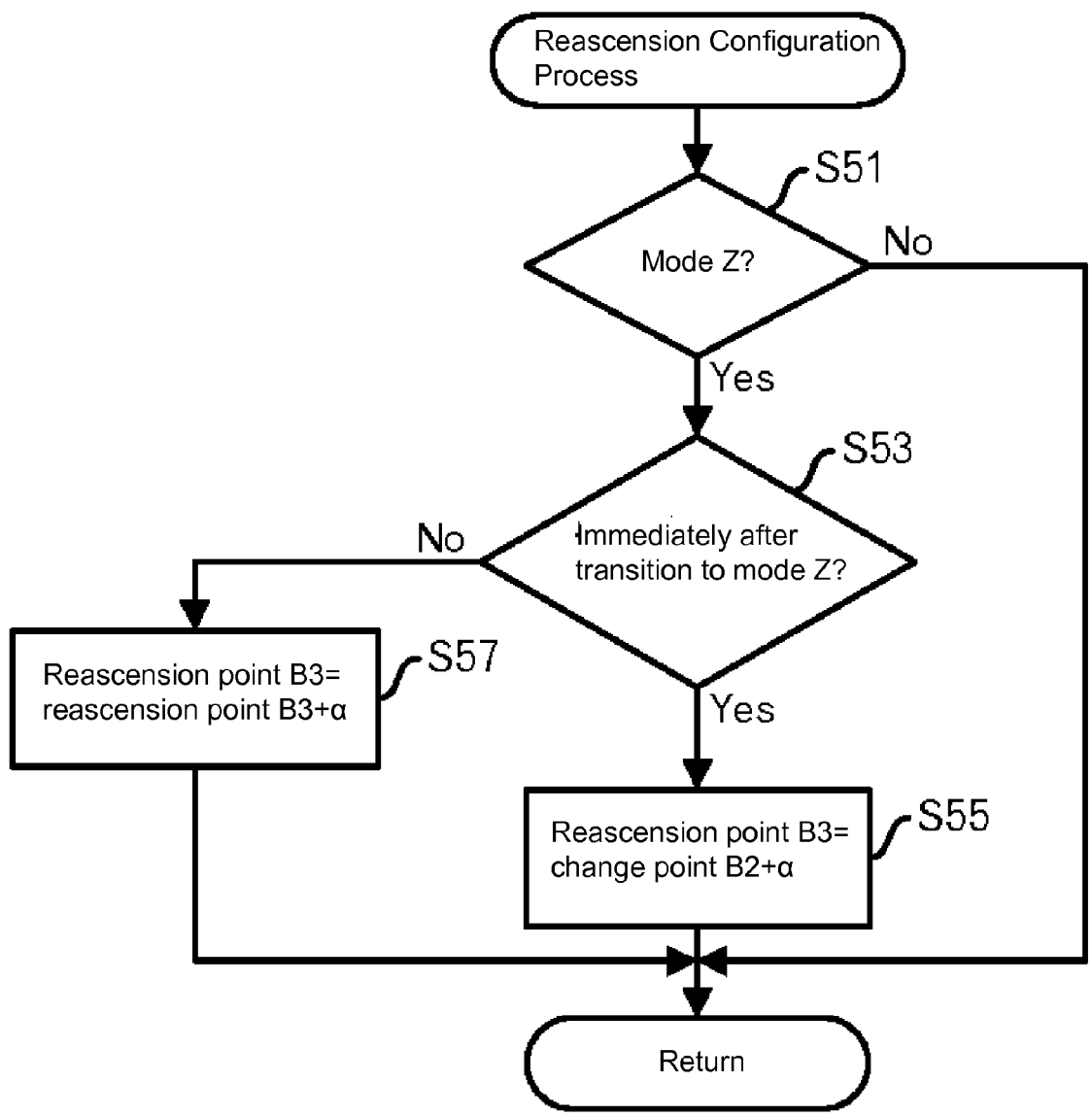
FIG. 17 is a view showing a process flow of a reascension point setting process.

Next, FIGS. 15 to 17 will be used to explain the processes of a control coefficient computing part 1201 for outputting such control coefficients.

The control coefficient computing part 1201 executes a mode setting process 2 (FIG. 15: step S31). The mode setting process 2 has a part slightly different from Embodiment 1. First, the mode setting process 2 will be explained using FIG. 16.

The control coefficient computing part 1201 determines if the vehicle is currently in the one-brake state (FIG. 16: step S41). If not in the one-brake state, the control coefficient computing part 1201 moves to the process in FIG. 12 via a terminal A. A process to set an initial mode and mode Y is similar to Embodiment 1, and thus a description thereof will be omitted.

However, if in the one-brake state, the control coefficient computing part 1201 determines if the one-brake state has been transitioned to from the two-brake state (step S43). If in the one-brake state from the start, the control coefficient computing part 1201 transitions to mode X, where the current control coefficient C is maintained at the maximum value after the current control coefficient C is increased until reaching the maximum value along slope α (step S45). Then, the process returns to the calling source process.

However, when transitioned from the two-brake state to the one-brake state, the control coefficient computing part 1201 transitions to mode Z, where the current control coefficient C is decreased along slope γ (negative value) and, after reaching the reascension point B3, is increased along slope α until reaching the maximum value (step S47). The maximum value is also maintained in mode Z when the maximum value is reached. Then, the process returns to the calling source process. In the present embodiment, the reascension point B3 is recalculated per every unit of time and so is separate from the mode setting process 2.

Returning to the explanation of the processes in FIG. 15, the control coefficient computing part 1201 executes a reascension point setting process (step S33). This reascension point setting process is executed for mode Z. The reascension point setting process is explained using FIG. 17.

The control coefficient computing part 1201 determines if the current mode is mode Z (FIG. 17: step S51). If the current mode is not mode Z, then the process returns to the calling source process.

However, if the present mode is mode Z, then the control coefficient computing part 1201 determines if mode Z has just been transitioned to (step S53). In other words, it is determined whether or not the mode has changed from one unit of time ago. If mode Z has just been transitioned to, then the control coefficient computing part 1201 computes reascension point B3=change point B2+α (step S55). Then, the process returns to the calling source process.

However, if mode Z has not just been transitioned to, but rather has been continuing for some time, then the control coefficient computing part 1201 computes reascension point B3=reascension point B3+α (step S57). Then, the process returns to the calling source process.

Returning to the explanation of the processes in FIG. 15, the control coefficient computing part 1201 modifies the current control coefficient C in accordance with the determined mode (step S35). In mode X, the control coefficient C increases by the coefficient value a, which increases per unit of time. In mode Y, the control coefficient C increases by the coefficient value β, which increases per unit of time. However, in mode Z, it is determined whether the reascension point B3 has been reached, and if the reascension point B3 has not been reached, the control coefficient C decreases by the coefficient value γ, which decreases per unit of time. If the reascension point B3 has been reached, then the control coefficient C increases by the coefficient value a, which increases per unit of time.

The control coefficient computing part 1201 determines if process termination has been indicated (step S37). The process is terminated if there is a process termination event, such as the power supply being set to OFF, or the like, for example. However, if there is no process termination, then the control coefficient computing part 1201 determines whether a state transition in the brake state has been detected (step S39). If there is no state transition present then the process returns to step S33. However, if there is a state transition present then the process returns to step S31.

By executing processes such as those described above, moment by moment computations are done for suitable control coefficients.

If the regeneration target value is constant, then the curve shown in FIGS. 13 and 14 expresses the time lapse in the output of the multiplier 1203 as is, for example. However, as described above, if the vehicle speed decreases, the regeneration target value will also decrease, so in general the curve will become lower than the curve shown in FIGS. 13 and 14 over time.

Embodiment 3

Figure 18:
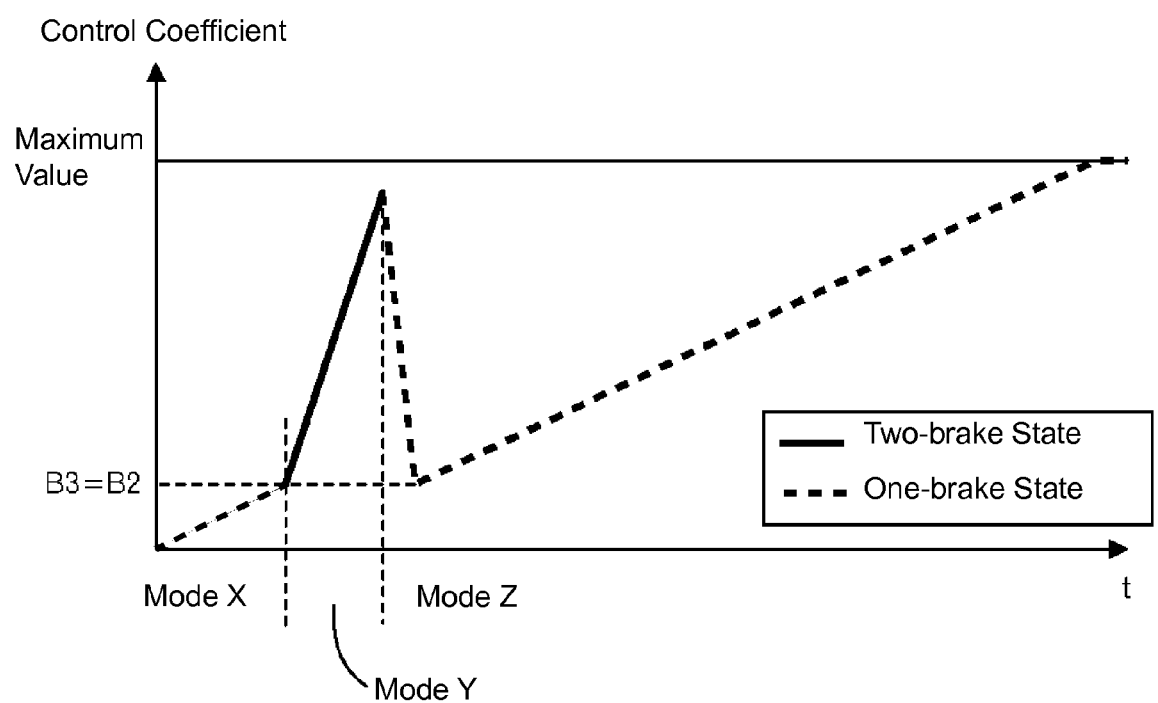
FIG. 18 is a view showing one example of a time lapse of a control coefficient according to Embodiment 3.

The reascension point B3 in both Embodiment 1 and Embodiment 2 must be found using calculation. However, as shown in FIG. 18, the change point B2 may be used as the reascension point B3. The rest is similar to Embodiment 1.

Figure 19:
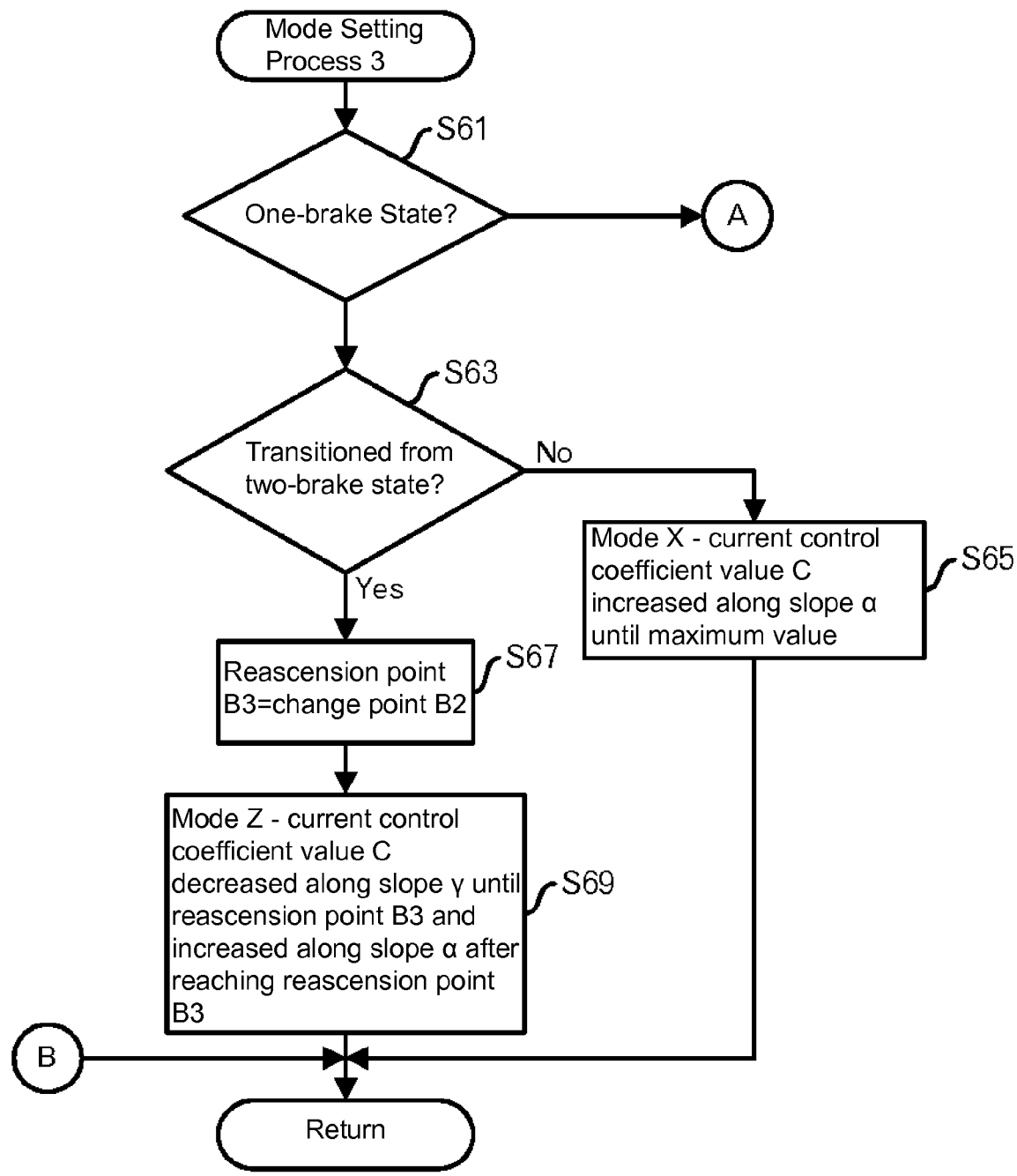
FIG. 19 is a view showing a process flow of a mode setting process 3 according to Embodiment 3.

Therefore, processes to be executed by a control coefficient computing part 1201 according to the present embodiment are basically the same as Embodiment 1. However, a mode setting process 3 such as shown in FIG. 19 is executed instead of that in FIG. 11.

The control coefficient computing part 1201 determines if the vehicle is currently in a one-brake state (step S61). If not in the one-brake state, the control coefficient computing part 1201 moves to the process in FIG. 12 via a terminal A.

In the one-brake state, the control coefficient computing part 1201 determines whether or not the one-brake state has been transitioned to from a two-brake state (step S63). If there has been no transition from the two-brake state and the vehicle has been in the one-brake state from the start, then the control coefficient computing part 1201 transitions to mode X, where a current control coefficient C is maintained at the maximum value after the current control coefficient C is increased until reaching the maximum value along slope α (<β) (step S65). Then, the process returns to the calling source process. As such, if the vehicle has been in the one-brake state from the start, then the control coefficient will be outputted in mode X.

However, if the one-brake state is returned to from the two-brake state, then as shown in FIG. 18, the control coefficient will be lowered.

Therefore, the control coefficient computing part 1201 sets reascension point B3=change point B2 (step S67). The control coefficient computing part 1201 then transitions to mode Z, where the current control coefficient C is decreased along slope γ (negative value) and, after reaching reascension point B3, is increased along slope α (step S69). By doing this, a change in the control coefficient is obtainable corresponding to the dotted line in the latter half of FIG. 18.

As also described above, the other processes are the same as in Embodiment 1.

The present invention is not limited to the embodiments described above. Slopes α and β in mode X and mode Y described above may be a combination of two or more kinds of slopes, and not just one kind of slope, for example. The control coefficient may initially increase along a first slope, and then increase along a second slope after a prescribed time, for example.

A specialized circuit may be used for a part of the computation part 1021, or a microprocessor may execute a program to realize functions such as those described above.

A specialized circuit may be used for a part or all of the controller for driving a motor 102, or a microprocessor may execute a program to realize functions such as those described above.

Figure 20:
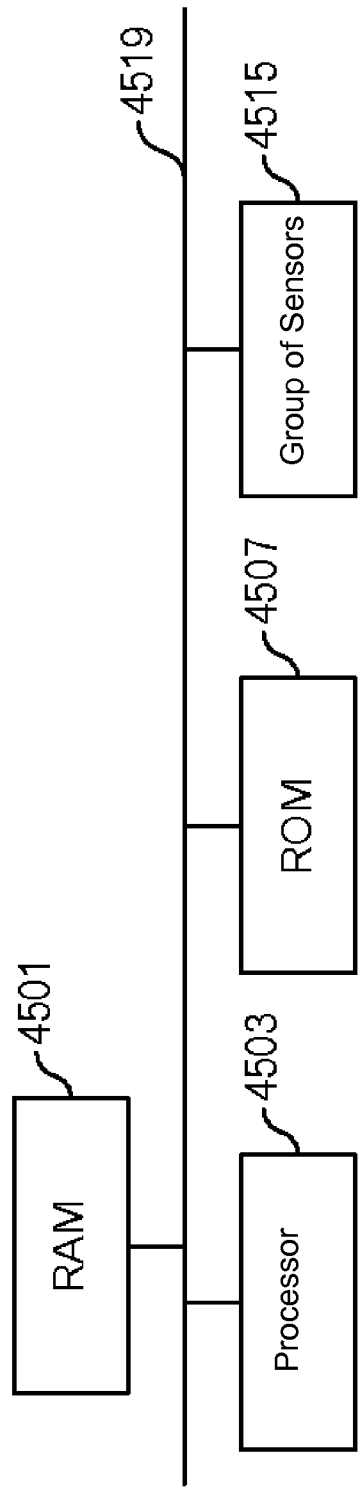
FIG. 20 is a function block diagram when using a microprocessor.

In this case, as shown in FIG. 20, the controller for driving a motor 102 has a RAM (Random Access Memory) 4501, a processor 4503, a ROM (Read Only Memory) 4507, and a group of sensors 4515, connected by a bus 4519. The program, and if present, an operating system (OS), for running the processes in the present embodiment are stored in the ROM 4507, and read out from the ROM 4507 by the RAM 4501 when executed by the processor 4503. The ROM 4507 also records threshold value and other parameters, and such parameters are also read out. The processor 4503 controls the group of sensors 4515 described above to obtain a measurement. Half-processed data is stored in the RAM 4501. The processor 4503 sometimes contains the ROM 4507, and sometimes contains the RAM 4501. In the embodiment of the present technology, a control program used to run the processes described above may be stored and distributed on a computer-readable removable disk, and written to the ROM 4507 using a ROM writer. Such a computer device realizes each type of function described above by the programs (and sometimes, OS) and hardware mentioned above such as the processor 4503, RAM 4501, ROM 4507 cooperating together organically.

It will be apparent to those skilled in the art that various modification and variations can be made in the present invention without departing from the spirit or scope of the invention. Thus, it is intended that the present invention cover modifications and variations that come within the scope of the appended claims and their equivalents. In particular, it is explicitly contemplated that any part or whole of any two or more of the embodiments and their modifications described above can be combined and regarded within the scope of the present invention.

What is claimed is:

1. A controller for driving a motor, comprising:
an input part that receives, from each of two brake sensors, a signal indicating that a corresponding brake is in an ON state or a signal indicating that the brake is in an OFF state;
a control coefficient computing part computing a control coefficient that determines a value of a control parameter that controls the motor relative to a target value of the control parameter, the target value being a value of the control parameter at which the motor achieves a desired power generation efficiency, the control coefficient computing part increasing the control coefficient along a first slope when a first signal indicating that only one of the brakes is in the ON state is received from the input part, the control coefficient computing part increasing the control coefficient along a second slope when a second signal indicating that both of the brakes are in the ON state is received from the input part, the second slope rising faster than the first slope; and
a control part that derives a value of the control parameter in accordance with the target value of the control parameter and the control coefficient computed by the control coefficient computing part, the control part forwarding the derived value of the control parameter to the motor to control driving of the motor.

2. The controller for driving a motor according to claim 1, wherein when the first signal is received after the second signal is received, the control coefficient computing part lowers the control coefficient to a value greater than or equal to the control coefficient when the second signal is received and lower than the control coefficient when the first signal is received after the second signal is received.

3. The controller for driving a motor according to claim 2, wherein the value greater than or equal to the control coefficient when the second signal is received and lower than the control coefficient when the first signal is received after the second signal is received is computed from the control coefficient when the second signal is received and the control coefficient when the first signal is received after the second signal is received.

4. The controller for driving a motor according to claim 2, wherein the value greater than or equal to the control coefficient when the second signal is received and lower than the control coefficient when the first signal is received after the second signal is received is calculated from the control coefficient when the second signal is received.

5. The controller for driving a motor according to claim 2, wherein the value greater than or equal to the control coefficient when the second signal is received and lower than the control coefficient when the first signal is received after the second signal is received is a value that has been increased along the first slope from the control coefficient when the second signal is received.

6. The controller for driving a motor according to claim 1, wherein the target value is variable.

* * * * *